UNITED STATES PATENT OFFICE.

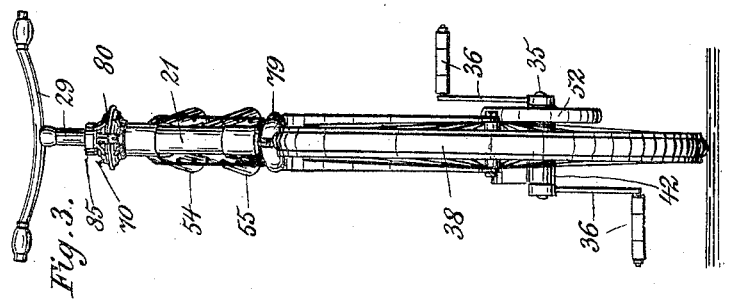

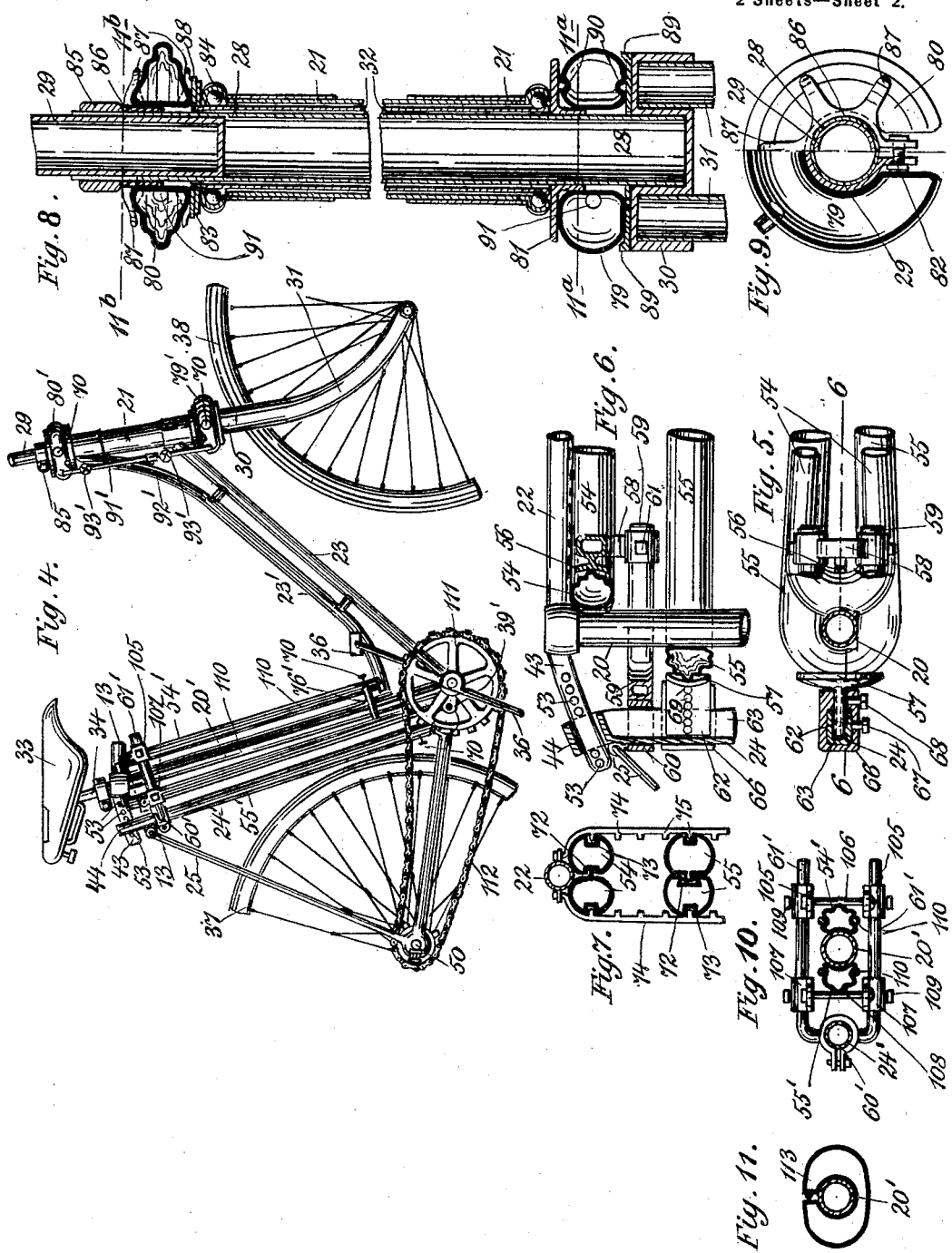

CHARLES L. HORACK, OF BROOKLYN, NEW YORK.

BICYCLE.

SPECIFICATION forming part of Letters Patent No. 689,967, dated December 31, 1901.

Application filed February 5, 1897. Serial No. 622,121. (No model.)

*To all whom it may concern:*

Be it known that I, CHARLES L. HORACK, a citizen of the United States, and a resident of Brooklyn, in the county of Kings and State of New York, have invented certain new and useful Improvements in Cycles, of which the following is a specification.

My invention relates to vehicles of various kinds, and more particularly to such vehicles, as bicycles and tricycles, which may be propelled by the person seated or mounted thereon or by any suitable motor.

As all the improvements invented by me are especially applicable to bicycles and as their construction and operation can be best illustrated and explained in connection with bicycles, I will in the following specification and in the drawings accompanying the same make reference particularly to bicycles.

The objects of my invention are to provide means for neutralizing or reducing the shocks imparted to a cycle owing to the roughness of roads and its meeting with obstructions in general and to protect the rider against such shocks and the reactions therefrom, also to provide several pneumatic cushions for such purpose in such manner that they may be connected together, and to provide means whereby the sensitiveness of these connected cushions while so acting conjointly may be adjusted. I accomplish these and other useful objects by means hereinafter described, and set forth more particularly in the claims.

In the accompanying drawings, forming part of this specification, and wherein like numerals of reference refer to corresponding parts, Figure 1 is a side elevation; Fig. 2, a ground plan with some of the upper parts of the bicycle broken off, and Fig. 3 a front elevation of a cycle constructed according to my invention, while Fig. 4 is a side elevation of the principal portion of a lady's bicycle embodying some of the leading features of my invention. The remaining figures illustrate details in the structures referred to. Fig. 5 is horizontal section along broken line 5 5 in Fig. 1, part of the cushioning-tubes appearing broken off; Fig. 6, a vertical section along broken line 6 6 in Fig. 5; Fig. 7, a section along line 7 7 in Fig. 1 looking toward the left. Fig. 8 is a vertical cross-section along the axis of the steering-post in Fig. 1, while the left-hand portion of Fig. 9 represents horizontal sections along line $11^a$ $11^a$ in Fig. 8 and its right-hand portion represents such a section along line $11^b$ $11^b$ in Fig. 8. Fig. 10 is a section along line 13 13 in Fig. 4 looking downward, and Fig. 11 a horizontal section of a saddle-post combined with a modified form of a pneumatic cushion. Figs. 1, 2, 3, and 4 are drawn to a smaller scale, and Figs. 8 and 9 to a larger scale, than the remaining figures.

In the different forms of bicycles illustrated the frame in each case comprises, essentially, three portions which are capable of relative automatic displacements within proper limits when shocks are imparted to it. One of these portions carries the saddle, while one of the other portions carries the driving-wheel and the other the front or pilot wheel. I will hereinafter term these frames the "seat-frame," the "driving-wheel" frame, and the "pilot-wheel" frame.

Referring now to Figs. 1 to 9, inclusive, the seat-frame comprises a saddle-post 20, steering-head 21, backbone 22, and lower brace 23, while the driving-wheel frame comprises a post 24, backstays 25, and rear forks 26 and 27. The pilot-wheel frame, in addition to the steering-post 28, with its handle-bar 29, forkhead 30, and fork 31, all joined together in usual manner, also contains a tube 32 interposed between steering-post 28 and steering-head 21.

33 is the saddle, having its supporting-shank 34 adjustably inserted in the upper straight part of saddle-post 20.

35 is the pedal-shaft, mounted in proper bearings in the lower forward corner of the driving-wheel frame, while 36 36 are the pedal-bars and pedals.

37 is the driving-wheel, and 38 the pilot-wheel. The saddle-frame and the driving-wheel frame are hinged together at 39, proper lugs 40 being provided for such purpose at the lower corner of the former, and lugs 41 on the casing 42, which contains the bearings for the pedal-wheel. As pedal-shaft 35 is very close to fulcrum 39 the distance between saddle 33 and said shaft remains substantially the same while the seat-frame and the driving-wheel frame are changing their relative positions, and danger of the rider losing the pedals at this time is guarded against.

43 is a projection extending rearward from the upper part of the saddle-post and being made to curve out of center 39. The upper portion 44 of post 24 is constructed as a yoke adapted to surround and to swing along projection 43, so as to guide the free ends of the two frames along each other.

45 is the pedal-wheel, mounted near one end of the pedal-shaft 35 and constructed as an interior gear-wheel meshing with a pinion 46 on an auxiliary shaft 47. 48 is a crank on said shaft, and 49 a corresponding crank on shaft 50 of the driving-wheel, and 51 a connecting-rod between said cranks, whereby motion is imparted from shaft 47 to shaft 50.

52 is a sectional casing secured to the driving-wheel frame and inclosing gear-wheels 45 and 46.

53 53 are holes in arm 43, and in two of the same are pins so inserted as to properly limit the relative displacement of the seat-frame and the driving-wheel frame and placed sufficiently close together to be able to prevent any such displacement in case the hereinafter-described cushioning device between said frames should from any cause become defective.

The cushioning device, more particularly intended to neutralize shocks imparted to the driving-wheel, is constructed as follows:

54 and 55 are U-shaped elastic tubes, preferably made of rubber. Their free ends are hooked to steering-head 21 or in any other proper manner secured thereto or held against the same. The central curved portions of said tubes are made to rest against saddle-post 20, that of tube 54 resting against its front surface and that of tube 55 against its rear surface.

56 is a shoe adapted to engage with the curved inner portion of tube 54, and 57 a shoe engaging with the curved outer portion of tube 55. Shoe 56 is mounted on a frame 58, which is adapted to slide along a fork 59, extending forward from post 24 at both sides of saddle-post 20 and secured to said post by a clamp 60, forming part of the shank of such fork.

61 61 are set-screws for securing frame 58 in any suitable position along said fork.

Shoe 57 is constructed in the form of a dishing-disk, the depression on its face approximately fitting the curving portion of tube 55 when the same is partly compressed. It is mounted on a flat rear shank 62, which fits into a groove 63, extending within post 24 downward to a point 64, where said post is made to fork, so as to have two points of support where it joins shell 65, which surrounds shaft 47 and supports the bearings for said shaft.

66 is a casing adapted to slide outside of and along post 24 and to be secured thereto at any proper point by a set-screw 67. Said casing is also capable of being connected with shank 62 by a set-screw 68, corresponding recesses 69 69 being provided along the center line of such shank for such purposes, so as to readily maintain said shank and shoe 57 in positions more or less approximating the positions of saddle-post 20, whereby greater or less initial compression may be imparted to tube 55. I prefer to so adjust shoes 56 and 57 that when the two frames occupy their normal relative positions both tubes will be partly compressed. Assuming now that wheel 37 suddenly strikes an obstruction in the road, this will cause the driving-wheel frame to swing toward the seat-frame, whereby tube 55 will be further compressed, thus yieldingly taking up the shock so imparted, while partly-compressed tube 54 will be permitted to respond, whereby a differential gradual resistance will be offered to such movement up to the point when reaction takes place and the two frames begin to swing away from each other. It is at this point and until the two frames have returned to their proper normal positions when there is danger of the rider being thrown out of the saddle, and it is here where tube 54 particularly comes into play, because its elastic resistance tends to prevent this, counteracted to some extent by tube 55, which is reëxpanding at the same time. Thus a gradual differential resistance is also opposed during the period of reaction. As each of said tubes is provided with an inflating-valve 70, it will be seen that the elastic resistances so offered may be adjusted as desired. By providing inflating-valves for the pneumatic cushions, which cushions are all normally closed to the atmosphere, and at the same time making the shoes coacting with them adjustable in their positions, so that for a given weight of the rider seated on the cycle the initial compression of the cushioning means may be adjusted at will, I am enabled to vary the degree of resistance and the sensitiveness of the cushioning device within greater limits than if either of said features were omitted. While I prefer to impart to both tubes an initial compression, as mentioned, it will readily be seen that I may do this only with reference to one of the tubes (and particularly tube 54, so as to offer promptly-yielding resistance when the reaction sets in) or that I may leave both tubes free from compression when the two frames occupy their normal relative positions.

71 is a hook whereby the free ends of pipe 55 are hooked to steering-head 21. The middle portions of posts 20 and 24 are arched, with the contact-point of hooks 71 as center of curvature, in such manner that the curved central portion of tube 55 may be moved along post 20 and casing 66, with shoe 57, along post 24 in such manner as to place their contact-points nearer to or farther from fulcrum 39, as may be desired. One of such modified positions is shown in broken lines in Fig. 1. It will be seen that by bringing tube 55 nearer to such fulcrum the compression of such tube under the same circumstances may be reduced, and vice versa. I prefer to make the contact-surfaces of tubes 54 and 55 corrugated, so that they may more readily respond when pressure is applied to them. Toward the steering-head I incline the outer surfaces of the branches of tubes 54 and 55 toward each other for the purpose of reducing the resistance of the column of air in front of the bicycle, and I prefer to interlock the adjoining walls of corresponding members, as shown more particularly at 72 in Fig. 7, so as to keep the same at the same elevation. In securing the free ends of tube 55 at 71 and also causing the branches of said tube to so interlock, the same, with the aid of shoe 57, is normally secured in its proper position around saddle-post 20, capable, however, of being detached or shifted promptly whenever desired.

It will be seen that tubes 54 and 55 before being inflated will possess much more flexibility than after inflation, and that in consequence they may when not inflated be readily detached from the frame, and that during and after inflation the outer surfaces of the branches of said tubes when the latter are attached to the cycle-frame will be forced outward and into interlocking positions. As the parts of tubes 54 and 55 between saddle-post 20 and steering-head 21 would have a tendency to deflect downward, I provide the same along their outer sides with longitudinal grooves 73 and secure stays 74 to backbone 22 and brace 23, providing the same with a series of projections 75, adapted to engage with said notches in the various positions in which said tubes may be placed. I thereby guard against sagging of the flexible tubes and their accidental lateral deflections and the relative displacement of their branches, so as to preserve the equilibrium of the bicycle and to keep the tubes in positions where they will offer least resistance to currents of air.

76 is an elastic connection between tubes 54 and 55, provided with a coupling 77 and a stop-cock 78 on each side thereof, whereby it is made possible not only to inflate both tubes simultaneously, but to also either operate the same separately or jointly as one continuous cushioning device, or to entirely detach one of said tubes from the apparatus while using the other one as described.

In employing tubes of comparatively small diameters as cushions and by applying pressures thereto substantially at right angles to their axes I not only provide large pneumatic reservoirs inclosing bodies of air capable of yieldingly resisting considerable shocks and accompanying deflections, but I also provide against considerable changes in their general outlines which might defeat the purposes aimed at. By making the connections between the main cushions flexible relative displacements of the parts of the cushions so connected are made possible without unduly straining the same or said connections.

Pneumatic cushions in the form of tubes may be readily attached to and detached from the bicycle-frame without greatly protruding therefrom and without offering much resistance or much surface to the atmosphere. To provide proper cushioning devices for the steering-post, so as to take up direct shocks imparted thereto and to yieldingly resist reaction, I provide the following appliances:

79 and 80 are two flexible pneumatic cushions, both placed around steering-post 28, of substantially horseshoe shape in ground plan. This form permits of readily placing the same in such positions and of detaching the same without in any way necessitating the temporary disorganizing of any part of the frame structure. 81 is a clamp collar or flange around said steering-post underneath steering-head 21, adapted to slide along said post unless clamped thereto by means of bolt 82. Cushion 79 is interposed between said flange and the top of fork-head 30.

83 is the usual locking-nut for preventing ring 84, which contains ball-bearings, from leaving the top of steering-head 21. The same in this case is screwed to tube 32 and serves as support for a washer 88 around steering-post 28 and upon which rests cushion 80.

85 is the clamping-ring commonly employed for securing handle-bar 29 to the upper divided end of the steering-post. Underneath said clamping-ring a collar 86 is placed around said post. Collar 86 and washer 88 are provided with prongs or fingers 87, adapted to engage with portions of the upper and lower surfaces of cushion 80, so as to make said cushion independent of the revolving motion of steering-post 28. A shock imparted to wheel 38 will force the steering-post upward with reference to head 21, thus compressing cushion 79, while when the reaction takes place cushion 80 will be compressed. I again prefer to impart to both cushions initial compression when parts 28 and 21 occupy their normal relative positions for reasons as stated above. If at any time upper cushion 80 should become defective and should have to be detached, collar 86 would have to be lowered so as to come to rest upon nut 83 and should be clamped there to steering-head 28, while in case cushion 79 were removed collar 81 should be clamped to the steering-post in direct proximity with fork-head 30, so as to thus properly limit the up-and-down play of post 28.

89 is a flange or washer that may be placed loosely around the steering-post on top of the fork-head, so as to guard against turning sidewise of cushion 79 with fork-head 30, 90 90 being projections on flange 81 and 89 extending into corresponding recesses on the upper and lower surfaces of cushion 79, so as to prevent relative lateral displacements of said washers and said cushions. Prongs 87 where they face cushion 80 enter into similar recesses in said cushion and for like purposes. Each of said cushions is provided with an inflation-valve 70.

91 is a flexible connection between cushions 54 and 80. The same is provided with a coupling 92 and a regulating or stop cock 93 at each side of the same. 94 is a corresponding connection between cushions 55 and 79, the same having a coupling 95 and regulating or stop cocks 96 at each side thereof. By making these connections of sufficient length and by employing the connections previously explained any of the cushions connected with the bicycle can be consolidated with any other portions of the general system of cushions provided, and thereby the advantages incident to large pneumatic chambers can be obtained for any of the cushions between the relatively movable frames. By the use of stop-cocks or regulating-valves in the connections between the different cushions it is of course possible to more or less restrict the area of such passage and to that extent adjust the sensitiveness of the different connected cushions. Thus, assuming first that stop-cock 96 nearest to cushion 79 be closed entirely while all the other stop-cocks be open, said flexible cushion inclosing only a small body of air would be much less yielding than if afterward said cock was wholly or partly opened, the sensitiveness and the quickness and energy of reaction after compression increasing as the passage between it and the other cushions was being increased by gradually and progressively opening said cock and quicker equalization of air-pressures between the two cushions were thus made possible. If then one of the stop-cocks 78 should be closed, the body of air resisting upward movement of the steering-fork would be reduced to the contents of cushions of 55 and 79, and the sensitiveness of the cushioning means resisting such displacement would be reduced accordingly normally. The stop-cocks between the various pneumatic cushions should be partly closed, so as to permit flow of air through the same forward and backward to some extent, but not sufficiently to simultaneously produce the same pressures throughout all the cushions upon sudden relative displacements of the different frame-sections, thus guarding against too abrupt compressions and reactions and making an intermediate cushion, such as 54 or 55, capable of simultaneously and gradually relieving several of the cushions with which it is connected.

By interposing one pneumatic cushion between the seating-surface of the saddle and one section of the frame and another pneumatic cushion between said seating-surface and another section of the frame and by properly connecting said cushions I obtain the advantages incident to the employment of a large pneumatic cushion with reference to either of said sections, it being well known that the sensitiveness of pneumatic cushioning means depends under otherwise equal conditions upon the size of the body of air affected. By making the pneumatic cushioning means detachable from the frame and from each other and capable of being operated jointly or singly and of being inflated independent of each other and by providing for rigidly securing to each other frame-sections cushioned upon such pneumatic cushioning means I am enabled to limit myself to the use of some of the cushioning means while temporarily discarding others.

Backstays 26 are directly connected with casing 42, surrounding the pedal-shaft, and with disks 104, attached to the casing carrying the ball-bearings for axle 50, while the other backstays 27 connect said disk with the lower forking part of post 24. Casing 65 around auxiliary shaft 47 I prefer to insert between post 24 and casing 42 without making any direct connection between said casings and backstays 25 and 26. I am thus enabled to join two said casings together along the full length of casing 65 in a very substantial manner, to make casing 65 independent of direct shocks from said backstays, and to spread out said backstays where they approach the running-gear more than could otherwise be done, thus securing greater rigidity to the frame.

In Figs. 4 and 10 saddle-post 20' and post 24' are made straight throughout and pneumatic tubes 54' and 55' are placed along post 20', cushion 54' being located in front of and cushion 55' in rear of said post and both closely adjoining thereto. Their functions are substantially the same as those of tubes 54 and 55, respectively. Only such a portion of backbone 13 is shown as is required to brace against its under surface or to otherwise secure thereto the upper end of tube 54', while its long end is similarly secured to brace 23'. Tube 55' is interposed in similar manner between arm 43 and any suitable point on the seat-frame. Fork 61' is constructed similar to fork 59 and is held to post 24' at any suitable elevation by spring-clamp 60'. The arms of said fork carry sliding sleeves 105, between which extends rod 106, adapted to coact with tube 54', and also sliding sleeves 107, carrying cross-rod 108, adapted to coact with tube 55', 109 being set-screws for holding these sleeves in their proper positions. 110 represents rods having their ends secured to parts of the saddle-frame and being inserted in proper grooves along tubes 54' and 55' for the purpose of confining the latter in their proper positions. In this case the ordinary chain running-gear is illustrated, the pivot 39' between saddle-frame and driving-wheel frame being located between the axle of sprocket-wheel 111 or the seat-frame and the axle of the driving-wheel. 112 is the sprocket-chain. 76' is a connecting-tube between tubes 54' and 55'. The cushioning devices for the steering-post are substantially like those heretofore described, the two cushions 79' and 80' being, however, connected directly by an elastic tube 91', having a coupling 92' and stop-cocks 93'. It will readily be seen that all the cushioning devices in this case can be joined together in manner similar to that described with reference to the cushioning devices, Fig. 1.

In Fig. 11 a pneumatic tube 113 is shown in cross-section, placed around saddle-post 20' in similar manner as cushions 79 and 80 are placed around steering-post 28, its sides which face each other being preferably hooked or otherwise temporarily joined together.

Instead of placing fulcrum 39' in the position above referred to it might be located near to or at axle 50 without requiring any considerable modifications as to the arrangement of the cushioning devices.

I do not wish to confine myself to the details and to the general arrangements of parts illustrated and described herein, as the same may be varied in many ways without departing from the spirit of my invention.

I claim—

1. In a cycle, the combination with a sectional frame having seat and wheel supporting sections capable of relative displacement, of the running-gear, two pneumatic cushioning means between such sections, a connecting-passage adapted to conduct air into and out of said cushioning means, and a cock in said passage for regulating such flows of air between the cushions.

2. In a cycle, the combination with a sectional frame having seat and wheel supporting sections capable of relative displacement, of the running-gear, two pneumatic cushioning means between said sections, a connecting-passage between said cushioning means comprising separable portions, a coupling between said portions, and stop-cocks on each side of said coupling.

3. In a cycle, the combination with the frame, the saddle and the running-gear, of two pneumatic cushions adapted to yieldingly resist relative displacements of the seating-surface of the saddle and one of the wheels, a restricted passage being provided for permitting flow of air forward and backward between said cushions, and means for regulating the operative area of such passage.

4. In a cycle, the combination with a sectional frame and the running-gear, of two pneumatic cushions adapted to yieldingly resist relative displacements of two of the frame-sections, a restricted passage between said cushions, and means for regulating the operative area of such passage.

5. In a cycle, the combination with a sectional frame, the saddle and the running-gear, of pneumatic cushioning means adapted to yieldingly resist relative displacements of the seating-surface of the saddle and one of the sections of the frame, other pneumatic cushioning means adapted to yieldingly resist relative displacements of said seating-surface and another section of the frame, said cushioning means and connections being closed to the atmosphere, a connecting-passage being provided for permitting flow of air forward and backward between said cushioning means, and a valve for inflating the cushioning means.

6. In a cycle, the combination with a sectional frame, the saddle and the running-gear, of pneumatic cushioning means adapted to yieldingly resist relative displacements of the seating-surface of the saddle and one of the sections of the frame, other pneumatic cushioning means adapted to yieldingly resist relative displacements of said seating-surface and another section of the frame, a connecting-passage between said cushioning means adapted to conduct air forward and backward between the same, a device for interrupting such flow of air, and a separate inflation-valve for each of said cushioning means for inflating the same after such separation.

7. In a cycle, the combination with a sectional frame, the saddle and the running-gear, of pneumatic cushioning means adapted to yieldingly resist relative displacements of the seating-surface of the saddle and one of the sections of the frame, other pneumatic cushioning means adapted to yieldingly resist relative displacements of said seating-surface and another section of the frame, a sectional connecting-passage with proper coupling being provided for permitting flow of air forward and backward between said cushioning means, and a closing device on each side of said coupling, for the purpose of permitting independent action of such cushioning means after separation of the sections of the coupling.

8. In a cycle, the combination with a sectional frame, the saddle and the running-gear, of pneumatic cushioning means adapted to yieldingly resist relative displacements of the seating-surface of the saddle and one of the sections of the frame, other pneumatic cushioning means adapted to yieldingly resist relative displacements of said seating-surface and another section of the frame, a connecting-passage between said cushioning means adapted to conduct air forward and backward between the same, and devices for fixedly securing the relatively movable portions of the cycle which are cushioned upon one of said cushioning means.

9. In a cycle, the combination with a sectional frame, the saddle and the running-gear, of pneumatic cushioning means adapted to yieldingly resist relative displacements of the seating-surface of the saddle and one of the sections of the frame, other pneumatic cushioning means adapted to yieldingly resist relative displacements of said seating-surface and another section of the frame, a connecting-passage being provided for permitting flow of air forward and backward between said cushioning means, and a device for regulating the extent of the play between the relatively movable portions of the cycle which are cushioned upon one of said cushioning means.

10. In a cycle the combination with a sectional frame, the saddle and the running-gear, of pneumatic cushioning means adapted to yieldingly resist relative displacements of the seating-surface of the saddle and one of the sections of the frame, other pneumatic cushioning means adapted to yieldingly resist relative displacements of said seating-surface and another section of the frame, a connecting-passage being provided for permitting flow of air forward and backward between said cushioning means, one of said cushioning means being detachably secured to the connecting-passage and the frame, the other cushioning means being adapted to be operated independent of said detachable cushioning means, and devices for fixedly securing to each other the portions of the cycle normally cushioned upon said detachable cushioning means.

11. In a cycle, the combination with a sectional frame, and the running-gear, of an air-chamber forming a pneumatic cushion between sections of the frame, a second air-chamber, and another air-chamber between aforesaid two air-chambers, restricted passages provided for permitting flow of air forward and backward between successive air-chambers, and means for adjusting the flow of air through one of said passages.

12. In a cycle, the combination with a sectional frame and the running-gear, of a pneumatic cushion between the seat-section and one of the wheel-sections, another pneumatic cushion between the seat-section and the other wheel-section, a connecting-passage between said cushions, and a valve in said passage for regulating the flow of air through the same.

13. In a cycle, the combination with the frame, the saddle and the running-gear, of pneumatic cushioning means comprising three chambers adjusted to resist relative displacement of the seating-surface of the saddle and one of the wheels, two restricted passages between portions of said cushioning means normally permitting flow of air forward and backward, and valves for regulating the flow of air through said passages.

14. In a cycle, the combination with the frame and the running-gear, of pneumatic cushioning means adapted to yieldingly resist relative displacements of the seating-surface of the saddle and one of the wheels and comprising three successive chambers, and a valve between the intermediate chamber and each of the end chambers, for permitting and regulating the flow of air forward and backward between said chambers.

15. In a cycle, the combination with a sectional frame and the running-gear, said frame comprising two hinged sections, of an elastic pneumatic cushion interposed between said sections, a shoe for deflecting said cushion adapted to be held at varying distances from the hinge, and means for holding portions of the cushion in contact with said shoe, while occupying such varying positions.

16. In a cycle, the combination with a sectional frame having a seat-supporting section capable of relative displacement with reference to a wheel-supporting section, and the running-gear, of a flexible pneumatic cushioning device interposed between said sections, and a suitable inflating-valve, said cushioning device having branches with portions adapted to be held in interlocking positions after inflation.

17. In a cycle, the combination with a sectional frame and the running-gear, one section of the frame carrying the seat and the other carrying one of the wheels, said sections being capable of relative displacement, of a flexible detachable U-shaped pneumatic cushion interposed between said sections and placed around portion of the circumference of one of the members forming one of said sections, a proper contact-surface being provided on the other section adapted to compress said cushion and to enforce contact between the cushion and aforesaid member and to confine said cushion in its position.

18. In a cycle, the combination with a sectional frame and the running-gear, one section of the frame carrying the seat and the other carrying one of the wheels, said sections being capable of relative displacement, of a flexible, detachable U-shaped pneumatic cushion interposed between said sections and placed around portion of the circumference of the saddle-post and having its sides extend forward and parallel with the frame, a proper contact-surface being provided on the other section adapted to compress said cushion opposite the saddle-post.

19. In a cycle, the combination with a sectional frame and the running-gear, of a pneumatic cushion interposed between the sections of the frame, a shoe in contact with said cushion, and fingers attached to said shoe and adapted to produce indentations at intervals upon flexible portions of the cushion when relative displacement of the sections of the frame takes place, portions of the cushion between such fingers being free from contact with said shoe.

20. In a cycle, the combination with a sectional frame having a seat-supporting section capable of relative displacement with reference to a wheel-supporting section, and the running-gear, of a pneumatic cushion interposed between said sections, portions of said cushion being secured to a portion of one of said sections and another portion of said cushion being adapted to be moved along another portion of said section, and means for holding it there in varying operative positions.

21. In a cycle, the combination with a sectional frame and the running-gear, of a shoe on one of the sections of the frame, a pneumatic cushion between the shoe and the other frame-section, means for fixedly adjusting said shoe in varying relative positions with reference to the frame-section to which it is attached and thereby adjusting its position with reference to said cushion, and means for varying the pressure within said cushion while maintaining such adjustment.

22. In a cycle, the combination with a sectional frame and the running-gear, one section of the frame carrying the seat and the other carrying one of the wheels, said sections being capable of relative displacement, of a detachable U-shaped pneumatic cushion interposed between said sections and placed around portion of the circumference of one of the members forming one of said sections, a proper contact-surface being provided on the other section adapted to compress said cushion and to enforce contact between the cushion and aforesaid member, and means for connecting the branches of said U-shaped cushion and thereby encircling said circumference.

23. In a cycle, the combination with a sectional frame and the running-gear, one section of the frame carrying the seat and the other carrying one of the wheels, said sections being capable of relative displacement, of a detachable U-shaped pneumatic cushion interposed between said sections and placed around portion of the circumference of one of the members forming one of said sections, a proper contact-surface being provided on the other section adapted to compress said cushion and to enforce contact between it and aforesaid member, and means independent of said contact-surfaces for attaching said cushion to the cycle-frame.

In testimony that I claim the foregoing as my invention I have signed my name, in presence of two witnesses, this 4th day of February, 1897.

CHARLES L. HORACK.

Witnesses:
 EMMA C. DEGHNIE,
 MAY S. AVERY.